United States Patent [19]

Hodkin

[11] Patent Number: 4,727,229
[45] Date of Patent: Feb. 23, 1988

[54] INTERRUPTER ISOLATOR

[76] Inventor: George A. Hodkin, 26 Oakley Drive, Long Whatton, Loughborough LE12 5DQ, England

[21] Appl. No.: 825,277

[22] Filed: Feb. 3, 1986

[51] Int. Cl.⁴ .............................................. H01H 33/66
[52] U.S. Cl. ............................. 200/144 B; 200/153 L; 200/153 LB; 200/146 R
[58] Field of Search ........... 200/146 R, 144 B, 153 L, 200/153 LA, 153 LB

[56] References Cited

U.S. PATENT DOCUMENTS

| | | | |
|---|---|---|---|
| 3,200,209 | 8/1965 | Fitzgerald | 200/153 LB |
| 4,087,776 | 5/1978 | Donato | 200/153 LB |
| 4,591,678 | 5/1986 | Yin | 200/146 R |
| 4,626,699 | 12/1986 | Oesterle et al. | 200/153 L |

FOREIGN PATENT DOCUMENTS 463017 11/1968 Fed. Rep. of Germany ...... 200/153 LB
523674 7/1940 United Kingdom ............ 200/146 R Primary Examiner—Robert S. Macon
Attorney, Agent, or Firm—Kirschstein, Kirschstein, Ottinger & Israel

[57] ABSTRACT

An interrupter/isolator assembly having a conducting member connected to one contact of a vacuum switch and movable to engage either an earth contact or an isolator contact incorporates a cam member for operating the conducting member and actuating the switch contacts, there being a degree of lost motion between the cam member and conducting member such that making or breaking of a current path between the second contact and either the isolator or earth contact occurs within the vacuum switch and not at the isolator or earth contact.

4 Claims, 4 Drawing Figures

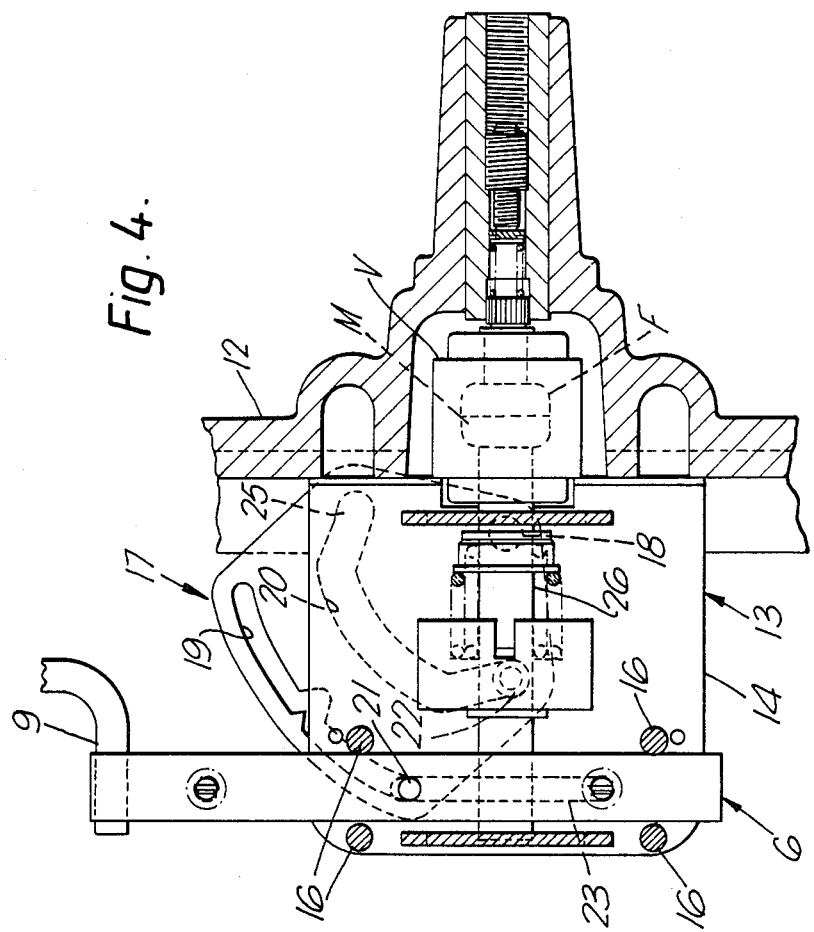
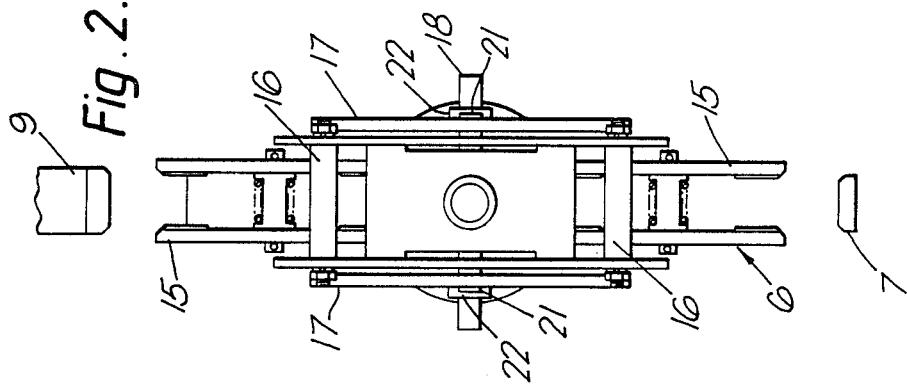

INTERRUPTER ISOLATOR

BACKGROUND OF THE INVENTION

1. Field of the Invention

This invention relates to an interrupter/ isolator assembly of the kind in which the interrupter is provided by a vacuum switch, and in which a conducting member connected to one contact of the switch, in use of the assembly, is movable to engage either an earth contact or an isolator contact, sometimes referred to as a busbar contact.

Such assemblies could find application, for example in some circuit breakers, fuse switches, and ring main units.

2. Description of Prior Art

Ring main units may, for example, incorporate a number of such assemblies disposed in three sections connected by busbars. Two sections are for connecting the unit into the ring main or for earthing the adjacent part of the ring main if required, and each incorporates an interrupter/isolator assembly for switching the busbars into or out of connection with the ring main. The third section forms a tee-off from the busbars through high voltage fuses to outgoing terminals, and incorporates a further interrupter/isolator assembly between each fuse and the respective busbar.

SUMMARY OF THE INVENTION

According to the invention an interrupter/isolator assembly of the kind referred to comprises a support for a vacuum switch, a conducting member connected electrically in use to a contact of the switch and movable to engage either an isolator contact or an earth contact, a cam member operable to effect the movement of the conducting member and to actuate the switch contacts, there being a degree of lost motion between the cam member and the conducting member such that, in use, the making or breaking of the current path between a second contact of the vacuum switch and either said isolator contact or said earth contact occurs within the vacuum switch and not at either the isolator or earth contacts.

The cam member is preferably pivotable about an axis, and the conducting member is conveniently of elongate shape constrained to move longitudinally and carrying a projection which extends into a generally arcuate slot in the cam member, the slot having a centrally disposed depression within which the projection seats when the cam member is in a central position in which the vacuum switch contacts are open, and is such that as the cam member rotates in either direction the engagement of the projection produces sufficient movement of the conducting member to cause it to engage the isolator contact or earth contact as the case may be, but further rotation of the cam member causes the projection to ride around the slot without producing further movement of the conducting member, said further movement of the cam member effecting the closure of the vacuum switch contacts.

The stem of the movable contact preferably also carries a projection which extends into a further slot in the cam member, which further slot has a central section of arcuate shape, and end sections which extend in a generally chordal direction such that as the cam member rotates in one or other direction from said central position no movement of the movable switch contact takes place initially, but when the projection enters the respective end section further rotation of the cam member causes the movable contact to be urged into engagement with the fixed contact to close the switch.

Thus the respective positions and shapes of the two slots are such that closure of the contacts only takes place after the conducting member has engaged the isolator contact or earth contact as above described. Similarly on rotation of the cam member back to the central position the movable vacuum switch contact is opened before the conducting member leaves the isolator contact or earth contact.

Rotation of the cam member is conveniently effected through a mechanical link.

BRIEF DESCRIPTION OF THE DRAWINGS

One embodiment of the invention will now be described by way of example with reference to FIGS. 1 to 4 of the accompanying drawings, in which FIG. 2 represents an end view of an interrupter/isolator assembly of one section of the unit, and FIGS. 3 and 4 illustrate another view of the assembly in two different operating positions.

DETAILED DESCRIPTION OF THE PREFERRED EMBODIMENTS

Figure 1:
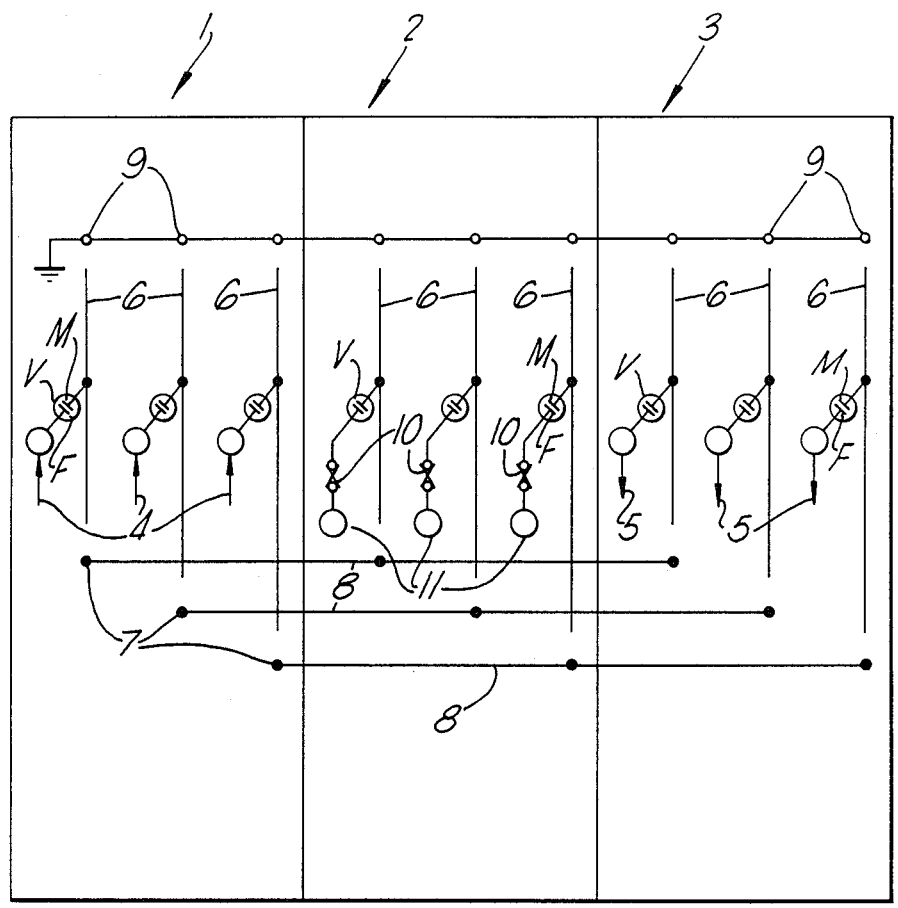
FIG. 1 represents a diagrammatic front view of a ring main unit.

A complete ring main unit consists of two sections for connecting the unit into the ring main and a centre section forming a tee-off to outgoing terminals. In a three phase ring main there are three cables going into the unit and three cables coming out, one for each phase, and one busbar for each phase within the unit connected to respective cables when the unit is switched into the ring main. One such unit is illustrated in diagrammatic form in FIG. 1, the three sections being shown at 1, 2 and 3 and the incoming and outgoing cables at 4 and 5 respectively. The cables are connected to the fixed contacts F of respective vacuum switches V in sections 1 and 3 of the unit, and the movable contacts M of the switch are connected to associated sliding conducting members 6 of bar form each of which can be moved to engage an isolator contact 7 connected to an appropriate one of the busbars 8 or an earth contact 9. The central section 2 of the unit also has three vacuum switches V the fixed contacts of which are each connected through a respective high voltage fuse 10 to an output terminal 11 for connection to a tee-off cable or to a distribution transformer. The movable contacts of the switches V of this central section are connected, as in the case of the outer sections 1, 3, to a sliding conducting member 6, which can be moved to engage either the isolator contact 7, connected to a respective one of the busbars 8, or an earth contact 9.

Thus the conducting members 6 are arranged to be connected to the isolator contacts 7 of the respective busbars 8 for connection of the unit into the ring main, and to the earth contacts 9 when it is desired to earth sections of the ring main between ring main units. When it is desired to switch the ring main unit out of the ring main, but not to earth the ring main the conducting members are arranged to be moved to the mid position as illustrated.

Figure 3:
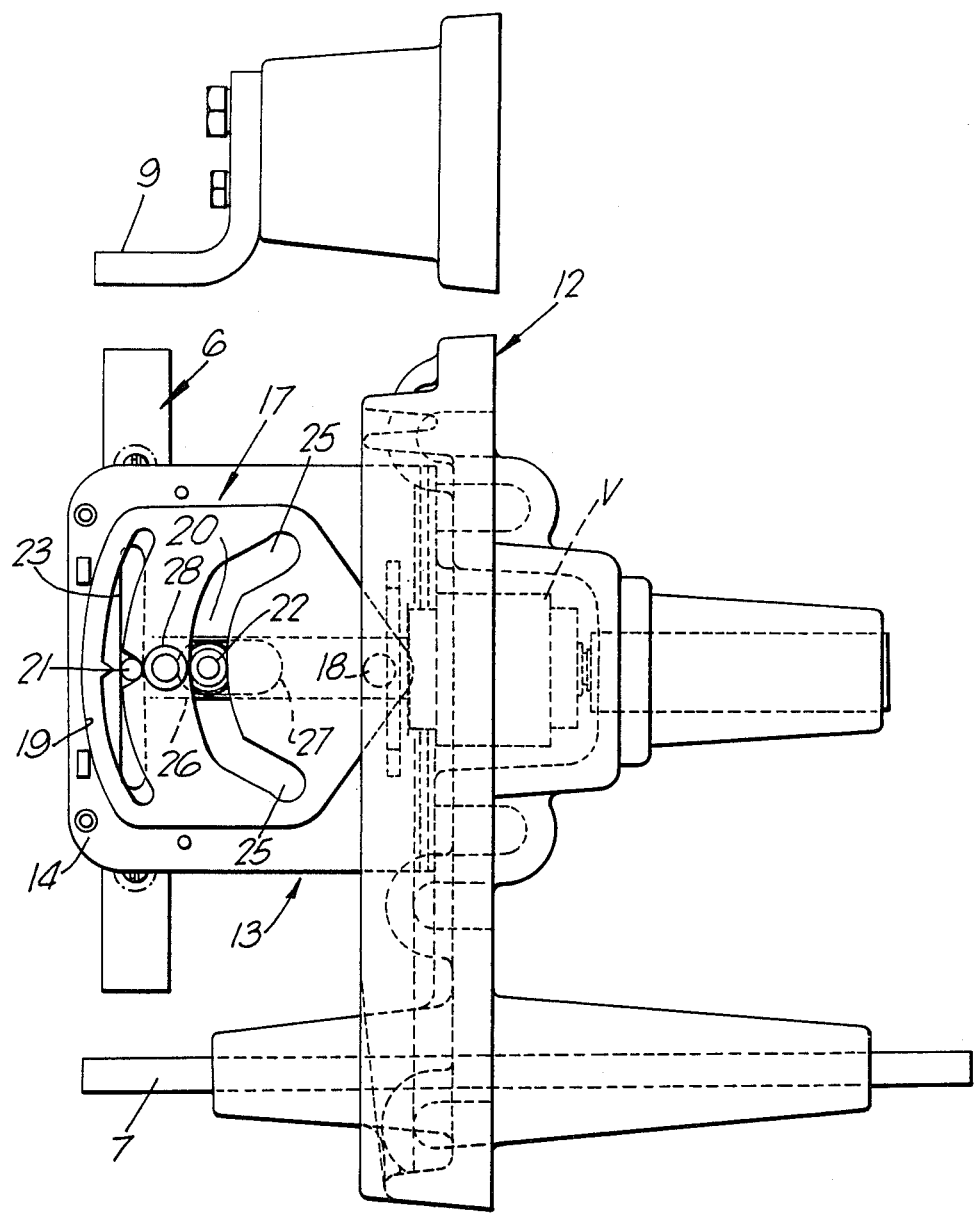

The operative parts of an interrupter/isolator assembly of one section of the ring main unit is illustrated in FIGS. 2 to 4.

The interrupter/isolator assembly illustrated comprises a switch housing provided by a base part 12 and a cover part 13 which support between them the respective vacuum switch V. The cover part 13 incorporates two spaced side walls 14 accommodating between them a slidable conducting member 6 formed by two interconnected metal bars 15 supported by four guides 16 extending between said side walls. The member 6 can be moved to engage either the respective isolator contact 7 or earth contact 9, or to a central open position in which neither of the contacts are engaged, as previously explained.

The cover part 13 also carries, on the outside of each side wall a cam plate 17 pivotally mounted on a spindle 18, and provided with a pair of mainly arcuate slots 19, 20. The bars 15 of the conducting member 6 carry between them a pin 21, the ends of which project through linear slots 23 in the side walls into the arcuate slots 19 in the two cam plates 17. The latter have, at their centres, a depression 24 into which the projecting ends of the pin 21 seat when the cam plates 17 and the conducting member 6 are in the central position as shown in FIG. 3. Accordingly rotation of the cam plates 17 in either direction causes the conducting member 6 to slide in the appropriate direction until it engages either the earth contact 9 as in FIG. 4, or the isolator contact 7. Further rotation of the cam plates 17 in the same direction causes the ends of the pin 21 to leave the depressions 24 so that, as the plates continue to rotate, no further movement of the conducting member 6 takes place in view of the arcuate shape of the slots 19.

The other slots 20 of the cam plates 17 have a central region of arcuate shape and two inclined end sections 25. The stem 26 of the movable contact M of the vacuum switch V also carries projections 22 extending through slots 27 in the side walls 14 and into the cam plate slots 20. In the central position of the cam plates 17 the switch contact M is urged into the open position and remains open as the plates 17 rotate, until the projections enter one or other of the end sections 25 of the slots 20.

Further rotation allows the switch contact M to move to the closed position in which it engages the fixed contact F.

The positions of the end sections 25 are such that, as the cam plates 17 rotate, the vacuum switch contacts remain open until the conducting member 6 engages either the isolator contact 7 or earth contact 9, so that the current path is closed at the vacuum switch only after connection is made to the isolator or earth contact as the case may be. Similarly when the cam plates are rotated back to the central position the vacuum switch contacts are opened before the depressions 24 reach the projecting ends of the rod 21 and cause the conducting member 6 to disengage from the isolator or earth contact and move back to the central fully open position.

Actuation of the cam plates 17 are conveniently effected by a mechanical link mechanism (not shown) of any suitable construction coupled to projections 28 on the cam plates between the slots 19, 20.

Although the invention has been described in relation to three-phase ring-main units it will be appreciated that it also has application in other form of switching arrangements of the kind in which current interruption is effected by a vacuum switch, for example some forms of single ring units, fuse switches and circuit breakers.

I claim:

1. An interrupter/isolator assembly comprising: a vacuum switch having a pair of actuatable switch contacts, a support for the vacuum switch, a conducting member connected electrically in use to one of the switch contacts and movable to engage one of an isolator contact and an earth contact, a cam member operable to effect the movement of the conducting member and to actuate the switch contacts, there being a degree of lost motion between the cam member and the conducting member such that, in use, the making or breaking of an electrical current path between another of the vacuum switch contacts and one of said isolator contact and said earth contact occurs within the vacuum switch and not at either the isolator or earth contacts.

2. An interrupter/isolator assembly according to claim 1 wherein the cam member is pivotable about an axis, and the conducting member is of elongate shape constrained to move longitudinally and carrying a projection which extends into a generally arcuate slot in the cam member, the slot having a centrally disposed depression within which the projection seats when the cam member is in a central position in which the vacuum switch contacts are open, and is such that as the cam member rotates in either direction the engagement of the projection produces sufficient movement of the conducting member to cause it to engage said one of the isolator contact and earth contact, but further rotation of the cam member causes the projection to ride around the slot without producing further movement of the conducting member, said further movement of the cam member effecting closure of the vacuum switch contacts.

3. An interrupter/isolator assembly according to claim 2 wherein the cam member has a further slot for receiving a stem of said one movable contact of the vacuum switch, the further slot having a central section of arcuate shape, and end sections which extend in a generally chordal direction such that as the cam member rotates in either direction from said central position no movement of said one movable switch contact takes place initially, but when the projection enters the respective end section further rotation of the cam member causes said one movable contact to be urged into engagement with said other switch contact to close the switch.

4. An interrupter/isolator assembly, comprising:
(A) a support;
(B) an isolator contact and an earth contact mounted on the support in spaced-apart relation;
(C) a vacuum switch mounted on the support and having a pair of switch contacts within the switch, one of the switch contacts being movable into engagement with another of the switch contacts to define a closed state, and being movable out of engagement with the other of the switch contacts to define an open state;
(D) a movable electrically conducting member electrically connected to said one movable switch contact, and being mounted on the support for movement into engagement with the isolator contact to define an isolated state, and into engagement with the earth contact to define an earthed state; and
(E) lost motion means operatively connected between the conducting member and said movable switch contact,
(i) said lost motion means being operative for initially moving the conducting member to one of the isolated and earthed states, and for subsequently moving said movable switch contact to the closed state, and (ii) said lost motion means being further operative for initially moving the conducting member away from said one of the isolated and earthed states, and for subsequently moving said movable switch contact to the open state.

* * * * *